United States Patent
Sutcliffe et al.

(12) 
(10) Patent No.: US 6,253,216 B1
(45) Date of Patent: Jun. 26, 2001

(54) METHOD AND APPARATUS FOR PROVIDING A PERSONAL PAGE

(75) Inventors: Andrew B. Sutcliffe, Tyngsboro; Dennis Geller, Brookline; Kevin A. Dunn, Boston, all of MA (US); Mikel Maron, Cupertino, CA (US)

(73) Assignee: Tele-Publishing, Inc., Boston, MA (US)

( * ) Notice: Subject to any disclaimer, the term of this patent is extended or adjusted under 35 U.S.C. 154(b) by 0 days.

(21) Appl. No.: 08/876,008

(22) Filed: Jun. 13, 1997

(51) Int. Cl.[7] .............................. G06F 17/21; G06F 17/30
(52) U.S. Cl. ............................................ 707/500; 707/530
(58) Field of Search .................................... 707/500–529; 345/433, 116, 326–339; 395/200.31, 200.33; 709/200, 201

(56) References Cited

U.S. PATENT DOCUMENTS

| | | | |
|---|---|---|---|
| 5,778,367 | * | 7/1998 | Wesinger, Jr. et al. ................. 707/10 |
| 5,835,712 | * | 11/1998 | DuFresne ........................ 395/200.33 |
| 5,893,111 | * | 4/1999 | Sharon, Jr. et al. .................. 707/104 |
| 5,898,780 | * | 4/1999 | Liu et al. ................................ 380/25 |
| 5,950,200 | * | 9/1999 | Sundai et al. ............................ 707/9 |

OTHER PUBLICATIONS

LDS, LDS Singles Connections, singles.ids.net, pp. 1–2, Dec. 1996.*

* cited by examiner

Primary Examiner—Kim Vu
Assistant Examiner—Alford W. Kindred
(74) Attorney, Agent, or Firm—Nutter, McClennen & Fish LLP

(57) ABSTRACT

The apparatus of the invention includes a local computer network. Remote users may connect to the local computer network through a larger network, such as the Internet. The local computer network has at least one server computer which can be accessed by remote users. The local computer network also has at least one computer software program and at least one database located therein. The computer software programs prompt a remote user to select a page template for displaying the personal page. The programs next allow the remote user to contribute text and graphics to the personal page. The programs also allow the remote user to authorize others to review the personal page. The programs store attributes representing the layout of the personal page, the text and graphics contributed by the remote user, and the authorization information entered by the remote user in the one or more databases located on the local computer network.

34 Claims, 8 Drawing Sheets

| User ID | Viewer ID | Last Viewed | Times Viewed | Page Changed | .... |
|---------|-----------|-------------|--------------|--------------|------|
| user1 | user2 | 06/02/97 | 1 | no | |
| user3 | user4 | 02/01/96 | 3 | yes | |
| . | . | . | . | . | |
| . | . | . | . | . | |
| . | . | . | . | . | |
| . | . | . | . | . | |

Security Attribute Table

*FIG. 5*

COOLGUY

Do you consider yourself to be a spiritual person?

Absolutely. Spirit is the essence of the mind, and the mind is the most exciting thing in the universe. I can't help feeling connected to something uniquely wonderful when I look through my telescope

If you watch television, what are your favorite programs?

As a science-fiction writer, I do enjoy that kind of show. Twilight Zone still ranks as the best, but DS9, X-files and B5 are worth being addicted to. And I can't miss Seinfield or Mystery.

Who are your heroes?

Arthur C. Clark is one. At once a great writer and a great environmentalist. Another is Thomas Becket (at least the movie version played by Richard Burton). I like the idea of someone changing their entire life because they had discovered a higher set of principles than they'd known before.

Do you talk to yourself when you are alone?

Sure, who doesn't. But I'd rather be talking to someone more interesting.

I work on a small town newspaper by day and write science fiction at night. I've done one Star Trek novel and gotten about a dozen short stories published. My dog Tiberius has appeared in three of them – and they used a picture of him to do the cover on one of the magazines. That made him so proud that he ate half the magazine! I don't much exercise as I should, besides running after Tiberius in the park, but I'm not totally out of shape.

What else can I say? The truth is, I've never been really good at writing romantic sceens; in my novel, Jim Kirk spent most of the time in solitary in an Andorian prison. So, I'm kind of at a loss for what to say here. But, I hope that I can find someone who can, among other things, improve the way I write about romance.

*FIG. 6*

METHOD AND APPARATUS FOR PROVIDING A PERSONAL PAGE

CROSS REFERENCE TO RELATED APPLICATION

Not applicable.

STATEMENT REGARDING FEDERALLY SPONSORED RESEARCH

Not applicable.

FIELD OF THE INVENTION

The invention relates to a method and apparatus for providing a personal page over a computer network. More particularly, the method and apparatus provide users with a secure way to display personal information to other computer network users.

BACKGROUND OF THE INVENTION

Many people are familiar with the "personals" section of many newspapers. The personals are advertisements placed by people who would like to meet other people with similar likes and interests. People place personal advertisements in newspapers to find activity partners to make new friends, to make acquaintances or to find people with whom intimate relationships may be formed.

As a result of the popularity of personals advertisements in newspapers, and the advent of the Internet's World Wide Web, systems for providing personals advertisements on networked computer systems have appeared. These personals systems may be made available to the public through software application programs referred to as Web browsers which are used to locate resources on the World Wide Web.

To date, however, these systems for providing personals on computer networks consist largely of the same information that is available in the newspaper advertisements. That is, the computerized personals merely mimic the newspaper advertisements. Conventional systems for providing personals advertisements on computer networks fail to utilize the added capabilities computers provide over newspapers. For example, different forms of personal information content, such as voice or image content may be provided on demand to a user via a personal computer coupled to a computer network. Conventional systems for providing personals advertisements on computer networks similarly fail to take advantage of the available resources and features of such networks. For example, conventional systems fail to provide communications between the persons placing the personals advertisements, and fail to effectively utilize the ability to restrict access to such information or communications.

Internet and other network service providers sometimes provide users with the ability to generate user-defined sites or pages on the World Wide Web. A user defined page allows users to convey information to the public by displaying text, images, movies, sounds and other multimedia information on such pages. The ability to convey information on such pages, however, often requires that the user be able to generate the page using a programming language or other protocol such as Hypertext Markup Language ("HTML"). One problem with this approach to providing user defined pages, however, is that many users of personals are not familiar with such languages.

Also, these World Wide Web pages provide no privacy. World Wide Web pages are generally available to any user of the Internet. Since the Internet allows access by users world-wide, a relatively large number of Internet users exist. The number of persons utilizing the Internet is generally believed to be at least in the tens of millions. With such a large number of users, it is desirable to restrict access to information on some pages or even to restrict access to some pages.

Another problem with World Wide Web pages is that it can be difficult to direct a desired audience to a particular page. The owner of such a page must simply hope that the desired audience, out of some tens of millions of users, finds the page.

Accordingly, it would be desirable to provide a secure method for providing personal information in a network environment which makes use of the multimedia opportunities available on such a medium, and makes the information available in a private way, i.e., only to those people that the person providing the information wishes to see the information.

SUMMARY OF THE INVENTION

In accordance with the present invention, a system for generating a page for display on a computer system accessible to a plurality of remote users through a computer network includes means for displaying at a user site at least one template, means for inputting user-data to be included in a predetermined area of the template, means for storing the user-data in a predetermined field of a database and means for retrieving the user-data from the database and for displaying the template and the user-data on a display of the computer system. In one embodiment, the system may be used to provide a personals page for use in a personals-on-line network. In this embodiment, remote users may connect to the personals-on-line network through a larger network, such as the Internet. The personals-on-line network includes at least one server computer which can be accessed by the remote users. The local computer network also has at least one computer software program and at least one database located therein.

The system prompts a remote user to select a page template for displaying the personal page. The system next allows the remote user to contribute text and graphics to the personal page. The system also allows the remote user to authorize others to review the personal page. The system stores attributes representing the layout of the personal page, the text and graphics contributed by the remote user, and the authorization information entered by the remote user in the one or more databases stored in the server computer.

The personal page may then be displayed upon request to an authorized viewer by retrieving attributes of the personal page from the one or more databases, creating a graphical page display from the attributes, and displaying the page to the authorized viewer.

In accordance with a further aspect of the present invention, a method of generating a personal page accessible to authorized users over a computer network includes the steps of storing a page template in a database accessible by a server processor, receiving user-defined information from a remote processor over a public network and storing the user-defined information in the database accessible by the server processor. With this particular arrangement, a method of storing information in a database and of utilizing the database to provide a page for viewing on a processing system coupled to the server over a public network is provided. In one particular embodiment, a user defined personals page for use in a personals-on-line network is provided. The personal page may be provided in such a way that only certain users are allowed to access the page. Thus, the page is relatively private. Moreover, the user may select one template from a plurality of different templates and thus the page can be customized. Each user, therefore, may generate their own unique personal page.

BRIEF DESCRIPTION OF THE DRAWINGS

The features of the invention may be more fully understood from the following detailed description of the drawings in which:

FIG. 5 illustrates an exemplary security attribute database table for use with the invention;

FIG. 6 is an exemplary illustration of a completed personal page of the invention.

DETAILED DESCRIPTION OF THE INVENTION

Figure 1:
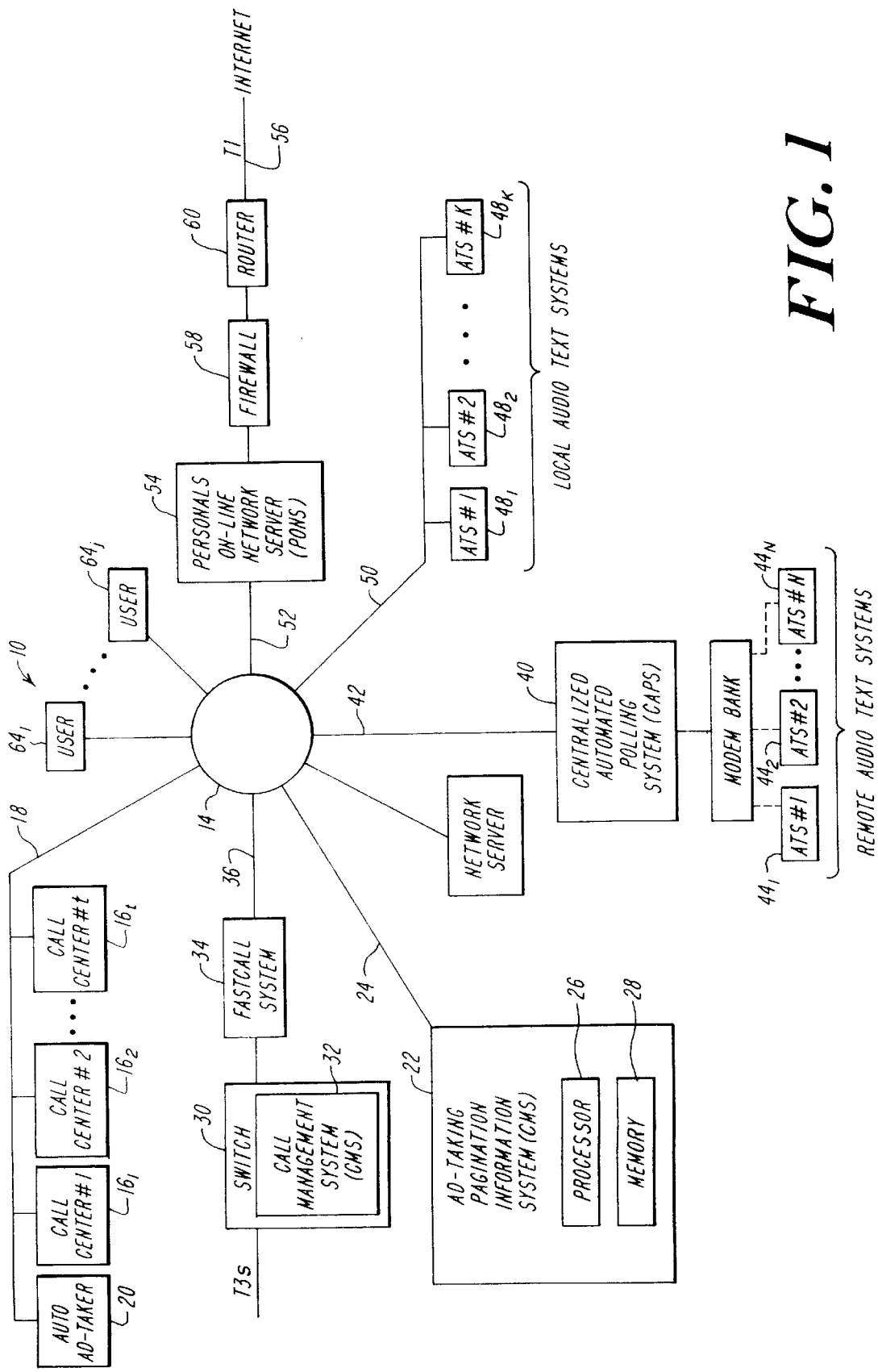
FIG. 1 is a block diagram of a network system for receiving, storing and processing personals advertisements.

Referring to FIG. 1, a network 10 is shown for receiving personal advertisements ("personals"), storing the personals and storing responses to the personals. While the present invention is described with particular reference to apparatus and methods for processing personal ads, it will be appreciated by those of ordinary skill in the art that various text can be processed by the apparatus and techniques described and claimed herein. Further, the particular network apparatus and architecture is illustrative only and can be varied without departing from the spirit of the invention.

The network 10 is used by a vendor to collect, store, process and distribute personals to one or more clients for publication and to store responses to the published ads. The network 10 includes a vendor network 14 which, in the illustrative embodiment, is a Local Area Network (LAN) 14.

A plurality of call centers $16_1$–$16_t$ for receiving personal ads via telephone lines are coupled to the vendor network 14 via a communication link 18, such as an Ethernet link. Each of the call centers $16_1$–$16_t$ includes a telephone line and a computer, such as a personal computer or workstation, at which an operator, or ad taker, is stationed. The ad taker answers telephone calls from individuals seeking to place personal ads (i.e., advertisers) and enters information gathered from the advertisers onto the call center computer. Each ad taker has a particular set of skills which, for example, may include an ability to speak a foreign language or specialized training in taking ads for a particular client. Calls are routed to a call center at which the ad taker is qualified to answer the particular call.

When an operator answers a telephone call, one or more ad taking screens appear on the display of the call center computer. The ad taking screens include a field identifying the client for which the ad is being placed and, further, include a plurality of fields that the ad taker completes in response to information provided by the advertiser. As examples, the advertiser provides and the ad taker enters the advertiser's name, address, telephone number, e-mail address (if any), category of the ad sought to be placed (e.g., female seeking male), text of the ad and answers to certain survey questions that the ad taker may ask. The survey questions may be developed by, and for the benefit of the vendor and/or the client.

Also coupled to the communication link 18 is an automated ad taker 20 by which personal ads can be placed via an automated telephone system. A caller to the automated ad taker 20 is prompted by a voice recording to answer a series of questions. The caller's answers are recorded and later transcribed onto ad taking screens of a call center computer.

Personal ads placed via the call centers $16_1$–$16_t$ or the automated ad taker 20 are stored in a database of an Ad Taking Pagination Information System (APIS) 22, referred to alternatively as an ad taking system, which is coupled to the vendor network 14 via a communication link 24, such as an Ethernet link. More particularly, APIS 22 includes a memory 28 in which the database is stored and a processor 26 on which a program is executed for managing certain operations of the network 10, as will be described. In the illustrative embodiment, APIS 22 is implemented on an Alpha computer of Digital Equipment Corporation.

Also coupled to the vendor network 14 are a telephone switch 30 including a Call Management System (CMS) 32 and a Fastcall system 34 including a Computer Telephone Integrator (CTI), both of which are products available from AT&T. The switch 30 is coupled between the Fastcall system 34 and a plurality of telephone lines, such as T3 lines, and routes the calls through the Fastcall system 34 to an appropriate one of the call centers $16_1$–$16_t$, as will be described. The Fastcall system 34 functions as an interface between the switch 30 and the network 14.

A plurality of local Audio Text System (ATS) machines $48_1$–$48_K$ are coupled to the vendor network 14 via a communication link 50, such as an Ethernet link. A plurality of remote ATS machines $44_1$–$44_N$ are coupled to the vendor network 14 via a first communication link, such as an Ethernet link 42, a Centralized Automated Polling System (CAPS) 40, a modem bank 46 and a plurality of telephone lines 62, as shown. The ATS machines permit telephone responses to personals published by the vendor's clients to be recorded, stored and accessed by the advertiser. Each of the ATS machines $44_1$–$44_N$ and $48_1$–$48_K$ includes a telephone interface to Plain Old Telephone Service (POTS) lines and T1 lines (not shown) through which personals responses are placed and accessed, a processor and media for recording and storing voice messages. In the illustrative embodiment, responses to ads are placed by calling a "900"number.

The voice recording media of each ATS machine is partitioned into a predetermined number of sectors (referred to as boxes), with each such box being telephone accessible by entering a number assigned to the box (i.e., a box number) and a corresponding security code. Associated with each box is a start date which indicates when the box is available and an end date which indicates when the box is no longer available.

The ATS machines $48_1$–$48_K$ are local in the sense of being located in relatively close proximity to the vendor and the ATS machines $44_1$–$44_N$ are remote in the sense of, generally, being located a significant distance from the vendor. Each of the remote ATS machines $44_1$–$44_N$ is located proximal to one or more of the vendor's clients, thereby enabling responses to personals to be made with less expensive telephone calls. In the illustrative embodiment, there are on the order of thirteen local ATS machines $48_1$–$48_K$ and on the order of eighty remote ATS machines $44_1$–$44_N$. However, it will be appreciated by those of ordinary skill in the art that the number of ATS machines, both local and remote, is a function of the number of clients serviced by the vendor, their geographic locations and the capability of each ATS machine.

The CAPS 40 communicates with the local ATS machines $48_1$–$48_K$ and the remote ATS machines $44_1$–$44_N$ for the purpose of obtaining certain statistical information from the ATS machines. Such statistical information includes, for each ad placed, a list of parameters applicable to the ad, and is used to verify a profile of the client used in text production, as described further in conjunction with FIGS. 6, 7 and 7A. Production refers to the accumulation and processing of personal ad text by the vendor and distribution of such text to a client. The client profile includes a list of various ad parameters and a corresponding weight assigned to each listed parameter, as will be discussed. CAPS 40 polls local and remote ATS machines at predetermined times (i.e., scheduled polling) as a function of the timing of production, and may also poll ATS machines in response to specific requests by APIS 22.

CAPS 40 also communicates with the ATS machines $44_1$–$44_N$, $48_1$–$48_K$ at the request of APIS 22 for the purpose of obtaining new box numbers and security codes to provide to advertisers and to cancel boxes whose end date has occurred. More particularly, APIS 22 stores one or more "box pools" (FIG. 4) for each of the vendor's clients, with each box pool including a list of available box numbers and corresponding security codes available to the client's advertisers. APIS 22 includes a box management program executed on the processor 26 by which the box pools are replenished and boxes are cancelled, as described in conjunction with FIGS. 5 and 5A.

The vendor network 14 may be further coupled to the Internet. To this end, a Personals On-line Network Server (PONS) 54 is coupled to a T1 line 56 to the Internet, typically via a firewall 58 and a router 60, as shown. Personal ads placed via the call centers $16_1$–$16_t$ may be posted on a client's web site via the server 54. Alternatively, personal ads may be posted directly onto the Internet. Further, responses to personals accessible via the Internet may be in the form of e-mail responses over the Internet and stored on the server 54. The PONS 54 is described in greater detail in a U.S. Patent application entitled "Interactive Personals Online Network Method and Apparatus" which is assigned to the assignee of the subject invention and filed on even date herewith and incorporated herein by reference.

One or more user machines $64_1$–$64_j$ located at the vendor's facility are coupled to the vendor network 14 for purposes of maintenance, monitoring and updating the system. Such user machines $64_1$–$64_j$ typically take the form of personal computers, such as Apple Macintosh computers. A network server 38 is likewise coupled to the vendor network 14 and manages various communications between network components, as will be described.

Figure 2:
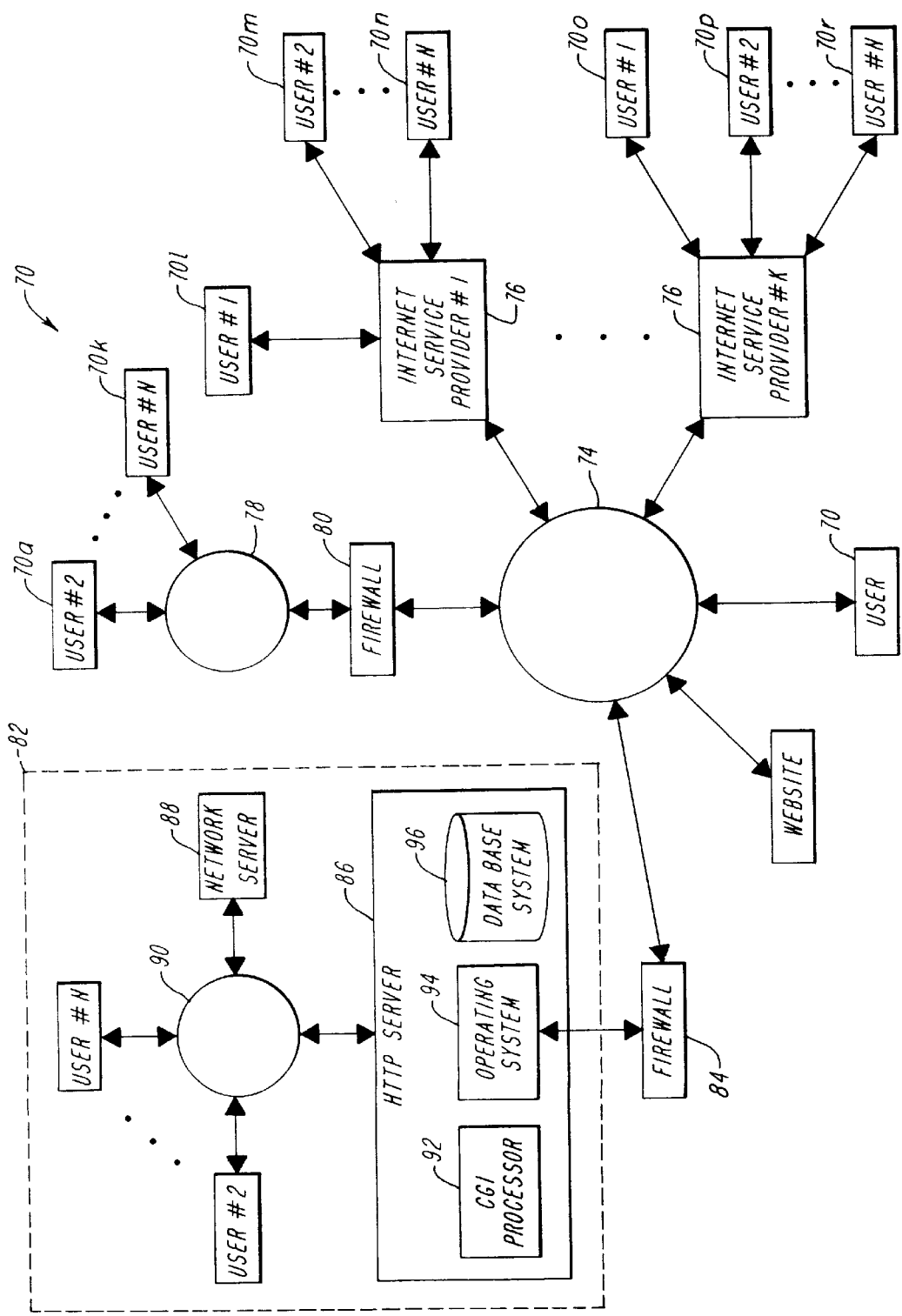
FIG. 2 illustrates an exemplary apparatus for providing a personal page.

An exemplary apparatus for providing a personal page will now be described by reference to FIG. 2. One or more of a plurality of remote user terminals 70a–70R generally denoted 70 may access a local computer network 72 by connecting the remote user's computer terminal 70 to a computer network such as the Internet 74. As used herein, the term "internet" generally refers to any collection of distinct networks working together to appear as a single network to a remote user. The term "Internet" on the other hand, refers to the so-called world wide "network of networks" that are connected to each other using the Internet protocol (IP) and other similar protocols. The Internet provides file transfer, remote log in, electronic mail, news and other services.

A remote user may connect a remote computer 70 to the Internet 74 in a variety of manners known in the art. A common method of making such a connection involves allowing the remote computer 14 to communicate with an Internet Service Provider ("ISP") 76 over telephone or other communication lines using a modem. The remote user 70 then accesses services available on the Internet 74 through the ISP's Internet communication facilities. Alternatively, users 70 may be coupled to the Internet 74 via a local area network 78 and a firewall 80.

A local computer network 82 is also connected to the Internet through a firewall 84 in one of the variety of manners known in the art. The local computer network 82 includes a least one server computer such as a Hypertext Transfer Protocol (HTTP) server 86 and a network server 88. HTTP server 86 and network server 88 are coupled via a communication path 90. HTTP is a network protocol used for transmission of files and other data on the World Wide Web. Thus, HTTP servers are commonly referred to as Web servers.

The remote users 70 may communicate with the HTTP server 86 using a software application known in the art as a Web browser. A Web browser and Web server have a client-server type relationship. More specifically, a Web browser is an HTTP client which sends requests to an HTTP server. The HTTP server responds to the requests by transmitting to the HTTP client resources identified by the request. Resources may be located on the Internet 74 using a Uniform Resource Locator ("URL"). Use of URL's is common in the art. By way of example, an HTTP server of the assignee of the present application may be addressed by the URL "http://www.tpigroup.com".

Resources that may be addressed over the Internet 74 include Hypertext Markup Language ("HTML") files. HTML is a document description language that defines the various components of a World Wide Web page. World Wide Web pages often include text and graphics as well as "links" which allow a viewer of the page to address other resources on the Internet including other HTML pages.

Resources that may be addressed over the Internet 74 also include software application programs. The Common Gateway Interface (CGI) is a standard for interfacing external software applications with information servers such as HTTP servers. A CGI program may be written in any programming language that may be executed on the computer network 82. Suitable programming languages include C/C++, Fortran, PERL, TCL, any Unix shell, Visual Basic or Java.

The exemplary HTTP server 86 executes one or more CGI programs 92 resident therein. The CGI programs 92 may be executed on an HTTP server 86, or on a separate computer connected to HTTP server 86 such as network server 88. The CGI programs may access an operating system 94 in order, for example, to access variables relating to the computing environment in which the CGI programs 92 are executed.

The CGI programs 92 may also access one or more databases which reside in the server 86 or another processor or storage device provided as part of the local computer network 88. A CGI program 92 may access the one or more databases by having query commands embedded in the CGI programs 92. These query commands may be provided in Structured Query Language (SQL). SQL is an industry standard query language which allows access to data in relational database management systems such as database system 96 for example.

Thus, a remote user 70 may access and use database 96 over the Internet 74 using the computer system of the invention by addressing a URL which corresponds to a CGI program 92 which accesses the desired database 96.

A method and apparatus of the invention for providing personal pages may be used in conjunction with a Personals On-line Network ("PON"). The PON may be implemented over the Internet 74 using HTML pages and CGI programs. The PON may include personals advertisements as well as more specific profile information regarding the advertiser and regarding the type of person that the advertiser would like to meet. The PON may provide searching facilities which allow users of the system to search other users' profiles in an attempt to find a match. The PON may provide electronic mail messaging, and anonymous electronic mail messaging, between users of the PON system. The PON may also provide a method and apparatus for storing voice greetings. Such voice greetings may be made accessible from the personal page of the invention.

A personal page may be generated and stored by prompting a remote user 70 who desires to generate a page to select a template for the personal page, then prompting the page-creating remote user 70 to enter or select text, graphics or other information capable of being stored on the local computer network 82. Attributes which define the personal page may then be stored in the databases 96.

Figure 3:
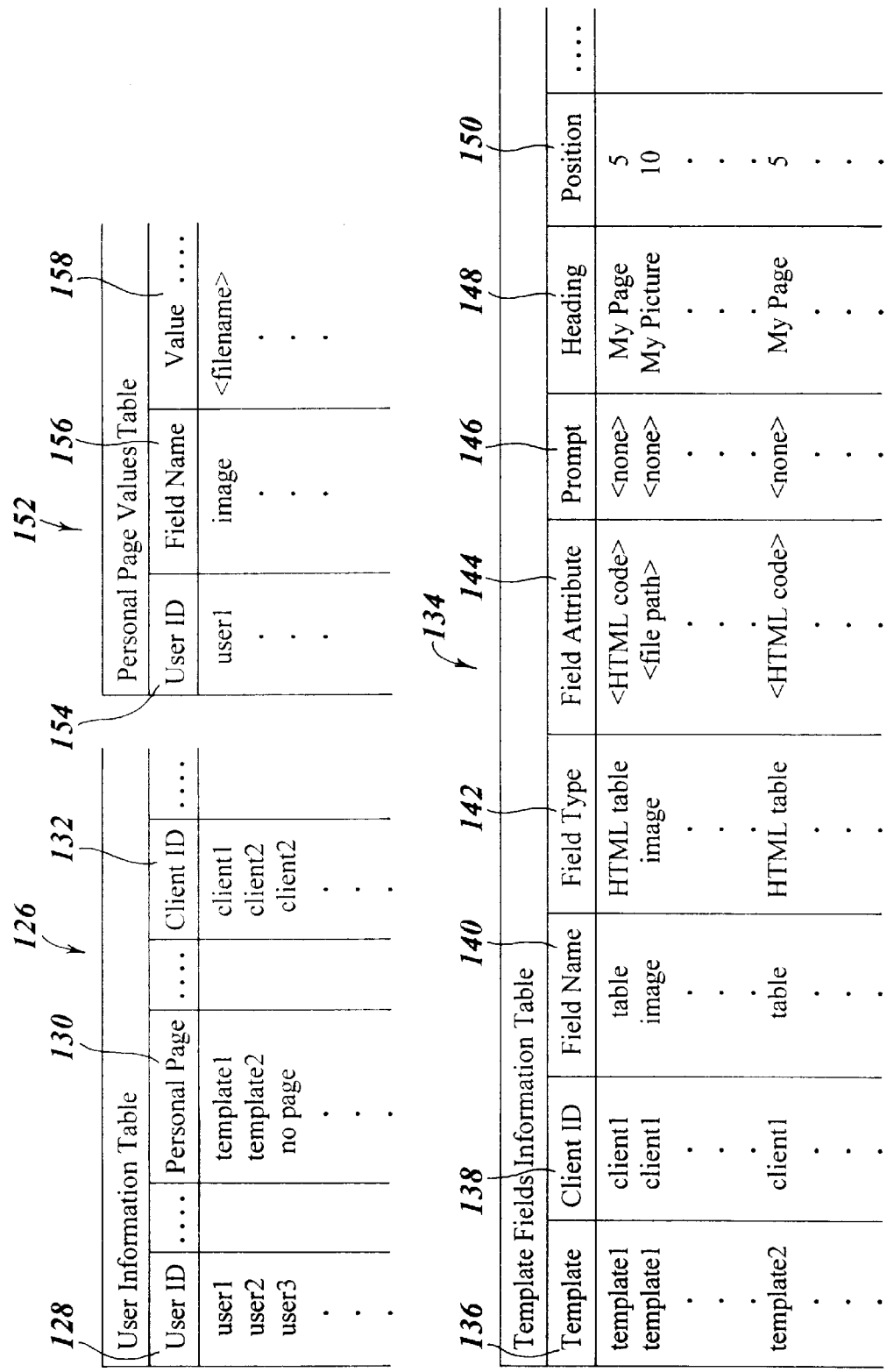
FIG. 3 illustrates a group of exemplary database tables for use with the personal page of the invention.

An exemplary database structure useful with invention is illustrated in FIG. 3. User Information Table 126 may be used by a PON system to store a variety of information relating to users of the system. For the purposes of the invention, the User Information Table 126 may include a User ID field 128 containing a unique user identification name or "handle" for each user of the system, and a Personal Page field 130 which may contain the name of a personal page template chosen by that user, or a value indicating that the user has not created a personal page. The User Information Table 126 may also contain a Client ID field 132.

The Client ID field 132 may be useful where the PON system includes advertisers from a variety of media. For example, the Client ID field 132 may identify whether an advertiser joined the service through the Internet, or whether the advertiser joined the service by placing an advertisement with a traditional newspaper personals system affiliated with the PON. Tracking such a client identifier allows for different personal page template options to be made available to users depending upon the client source.

A Template Fields Information Table 134 may also be provided. This table may store information about the layout of different personal page templates that may be used to create a personal page.

The Template Fields Information Table 134 includes a plurality of rows, each of the rows corresponding to a single template. In particular, there may be a row for each of a plurality of fields that may be defined on a particular template page design. Such fields may include image, text, icon, background, HTML or HTML table fields. It is preferable that one row for each template define the overall layout of the page, including information as to how each field fits onto the page. This information may be provided in the form of an HTML table.

The Template Fields Information Table 134 may include the following fields:

Template 136—a name identifying an individual template page design

Client ID 138—the identity of a client with whom the template is associated

Field Name 140—a name identifying the field described by the entry in the table having that name Field Type 142—a value indicating how the entry is selected and displayed Field Attribute 144—the information to be displayed, this field may include HTML code as well as a user selected or entered value from a Personal Page Values Table 152 as described below Prompt 146—this field might include question text where the field represents an answer to be entered by a user Heading 148—a heading or title for the field Position 150—a number representing the position of the field on the template page A Personal Page Values Table 152 may also be provided which includes a User ID field 154 for identifying the user, a Field Name field 156 for identifying a field in a template page and a Value field 158 for storing a user selection or entry relating to the identified field.

Figure 4:
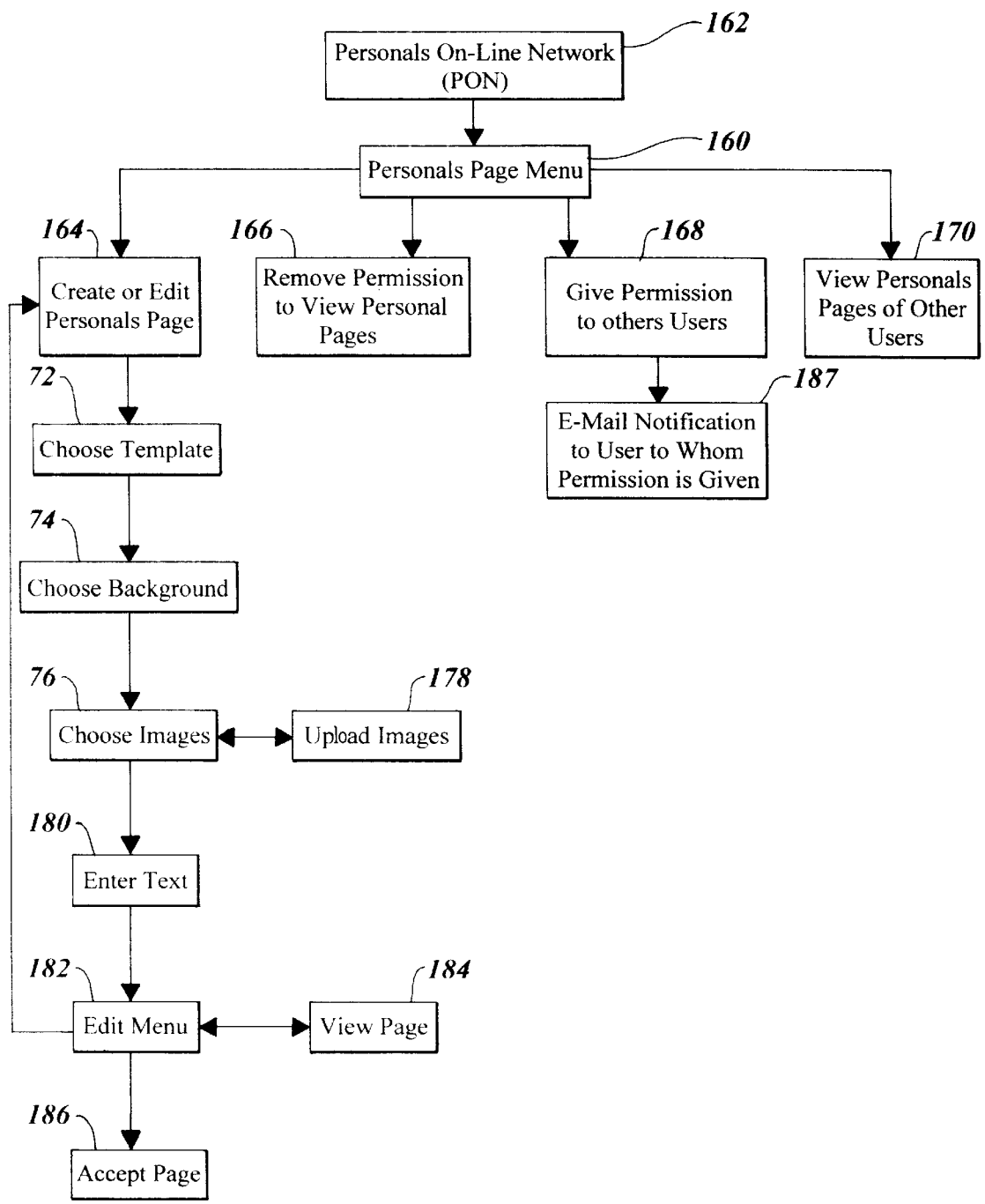
FIG. 4 is an exemplary flow diagram for a method of the invention.

An exemplary method for providing a personal page will now be described by reference to FIG. 4. As shown, the method for providing a personal page may contain many discrete steps. Each of these steps may be manifested to a remote user as a single HTML page which presents the user with options to move to another HTML page or to cause some appropriate action to occur as described herein. It will be appreciated by a person of ordinary skill in the art that the method described in FIG. 4 may be presented to a remote user 10 in other formats without departing from the spirit of the invention described herein.

A Personal Page Menu 160 may be accessed from a Personals On-line Network ("PON") server 162. The Personal Page Menu 160 may present the page-creating remote user 70 with optional links to the Create or Edit Personal Page 164, Remove Permission 166, Give Permission 168, or View Personal Pages 170 HTML pages. Each of these options leads the remote user to additional pages having the functionality to accomplish the task identified by the titles. Following the Create or Edit Personal Page 164 option, the remote user 70 may be presented with a Choose Template 172 page. The Choose template page 172 presents the remote user 70 with a variety of templates which can provide a graphical layout for the remote user's personal page.

Figure 4A:
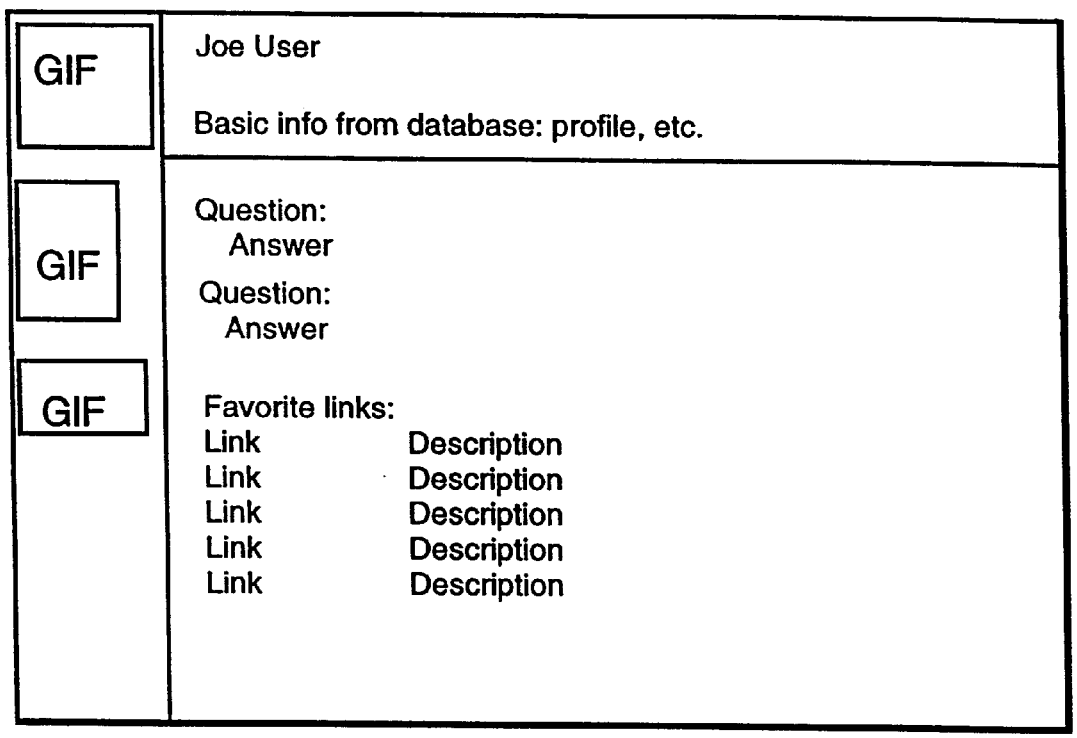
FIG. 4A is an exemplary template for a personal page of the invention.

Referring briefly to FIG. 4A, an exemplary template 188 is shown. A template is a World Wide Web style page design which includes graphics and page layout information. The template may be designed to include a number of fields that may include user entries or selections which personalize the template page. The entries or selections may be made by the user in subsequent steps in the personal page creating method.

A finite number of templates are provided for selection by a remote user. The templates are stored in an appropriate node of computer network 82 as HTML page descriptions. When a template is selected by a remote user, the system typically stores only a name attribute for the template in the User Information Table 126. The name represents an entry or series of entries in the Template Fields Information Table 134 where the HTML and other descriptions for that template are located. In this manner, the page layout information for each template does not have to be stored for each user who creates a personal page.

Referring again to FIG. 4, once a template is chosen, the remote user 70 may then be led to a Choose Background 74 page. Here the remote user may be presented with optional selections for color schemes for coloring the personal page. The remote user may also be presented with background graphics which may be selected for display with the personal page. A background attribute may be a name that indicates a pre-stored color scheme for a particular template. Or, a background attribute may be stored as a field for the template as described above.

After selection of a background by the remote user, the remote user may be presented with a Choose Images 176 page. Here, the remote user may select an image for display on the remote user's personal page from a collection of images previously stored on the Local Computer Network 82, or the remote user may enter or upload an image (Upload Images 178) from the remote user's remote computer 70. Uploaded images may comport with any of the standards known in the art for displaying such images on a computer, including the well-known GIF and JPEG standards. Upon uploading of an image by a remote user, the uploaded image may then appear on that remote user's Choose Images 176 page, and may be chosen by the remote user for inclusion on the personal page. An image attribute, perhaps indicating the name and location of the image file on the local computer network 82, may be stored as a Value 158 in the Personal Page Values Table 152 which corresponds to an image field in the template page. Size limits, both in terms of viewing size and storage size of the image, may be employed to limit the size of uploaded images. Depending upon the template selected, the remote user may be presented with more than one opportunity to select or upload an image.

Once an image has been selected for display on the personal page, the user may next be presented with an Enter Text 180 page. The Enter Text 180 page may allow the remote user to enter any free form text. The Enter Text 180 page may also present the remote user with questions to answer, or some combination of questions and free form text for display on the personal page. Text attributes may be stored as text in Value 158 fields in the Personal Page Values Table 152 which corresponds to a text field in the template page. Depending upon the template selected, the remote user may be presented with a series of Enter text 180 pages, or a series of fields for entering text on a single Enter Text 180 page.

For each selection or entry made by the remote user in the above-described steps, attributes of the selection or entry which describes the remote user designed personal page are stored temporarily until such time as the remote user has finished entering information. This temporary storage may be achieved by a number of methods known in the art. When selection or entry of a template, background, images and text is complete, the remote user may then be presented with an Edit Menu 182 page. The Edit Menu 182 page provides the remote user 70 with options to view the personal page having the remote user selected attributes (e.g. View Page 184), re-edit the personal page, or accept the personal page (Accept Page 186).

If the remote user chooses to re-edit the page, the remote user may be provided with a link to the Create or Edit Personal Page 164 page where the remote user may begin anew the process of selecting or entering personal page attributes. Or, the remote user may be provided with links to the Choose Background 174, Choose Images 176, or Enter Text 180 pages for editing only those attributes.

If the remote user chooses to view the personal page having the attributes selected or entered by the remote user, the personal page is generated "on the fly" and displayed to the remote user. That is, a CGI program is executed that combines the page attributes selected or entered by the remote user and the HTML and other descriptions for the selected template page and displays the resulting graphical page to the remote user in the manner of a World Wide Web page.

If the remote user chooses to accept the personal page that the remote user has created or edited as shown in step 186, the attributes of that personal page are stored in database 96 on the Local Computer Network 82. That is, upon acceptance of the page by the remote user, the attributes of the personal page are stored in the database system 96 by inserting rows containing the information described above into the User Information Table 126 and Personal Pages Values Table 152.

A remote user may also choose, from the Personal Page Menu 160, to access the Give Permissions 168 page. From the Give Permissions 168 page, the remote user may grant permission to other users to view the remote user's personal page. To accomplish this, the remote user may be prompted for the name of the user to whom the remote user wishes to give permission.

Referring now to the Security Attribute Table 200 of FIG. 5, a permission attribute, consisting of the name of the remote user (User ID 202) wishing to give permission and the user to whom permission is given (Viewer ID 204), may then be stored in a database 96 on the local computer network 82 by a CGI program executing on a CGI processor 92. The CGI program may also cause an electronic mail message to be sent to the user to whom the permission is given, informing that user of the permission (E-Mail Notification 187).

The Security Attribute Table 200 may also store information such as the last date that the viewer viewed the personal page (Last Viewed 206), the number of times that the viewer has viewed the personal page (Times Viewed 208) and whether or not the personal page has been edited since the last date that the viewer viewed the personal page (Page Changed 210).

In an alternative embodiment, the remote user is prompted to send an electronic mail message to the user to whom the remote user wishes to give permission. The remote user may then be given an option to give permission to view the personal page to the recipient of the electronic mail message. Next, when the message is sent, a record representing the permission granted may be created and stored in database 96 on computer network 82.

The remote user may also remove permission from other users to see the remote user's personal page or remove permission for himself or herself to view the personal page of another user (Remove Permission 166). This step may be accomplished by prompting the remote user with the name of each user to whom permission has been given to see the remote user's personal page. The remote user then selects one such user and a CGI program 92 on the network 82 uses the remote user's name and the user name selected by the remote user to locate the record according permission in database 96 on the computer network 82. The record may then be deleted from the database 96 and the permission for that user to see the remote user's personal page is withdrawn. The remote user may remove his or her own permission to see the personal page of another in a similar manner.

The remote user may also be given an opportunity, from the Personal Page Menu 160, to view the personal pages of other users (View Personal Pages 170). Upon choosing this option, the remote user may be presented with a list of other users who have given the remote user permission to see their personal pages. Such a list might be generated by reviewing the Security Attribute Table 88 for records indicating permissions given to the remote user.

Access to a personal page of the invention may then proceed as follows. When a remote user chooses to view a personal page which that remote user has permission to see, a CGI program is executed on server 86 (FIG. 2) to display the personal page to the remote user. The program first looks up the User ID 128 of the creator of the personal page in the User Information Table 126 and retrieves the template name from the Personal Page field 130. The program next locates each entry in the Template Fields Information Table 134 which corresponds to the template name. Using the Field Name field 140 from the Template Fields Information Table 134 and the User ID 128 of the creator of the personal page, the program locates the Value 158 in the Personal Page Values Table 152 which corresponds to each of the fields in the template. The program then assembles all of the fields corresponding to the personal page and "prints"them in the manner of a World Wide Web page to be viewed by the remote user having permission to view the personal page.

Referring now to FIG. 6, a completed personal page 220 generated from a template such as template 188 (FIG. 4A) is shown. The personal page 220 includes features such as a heading 222 containing the user name of the user who created the page, user selected or uploaded graphics 224, 226, question and answer text fields 228, 230, 232, 234 and a free form text field 236.

Figure 7:
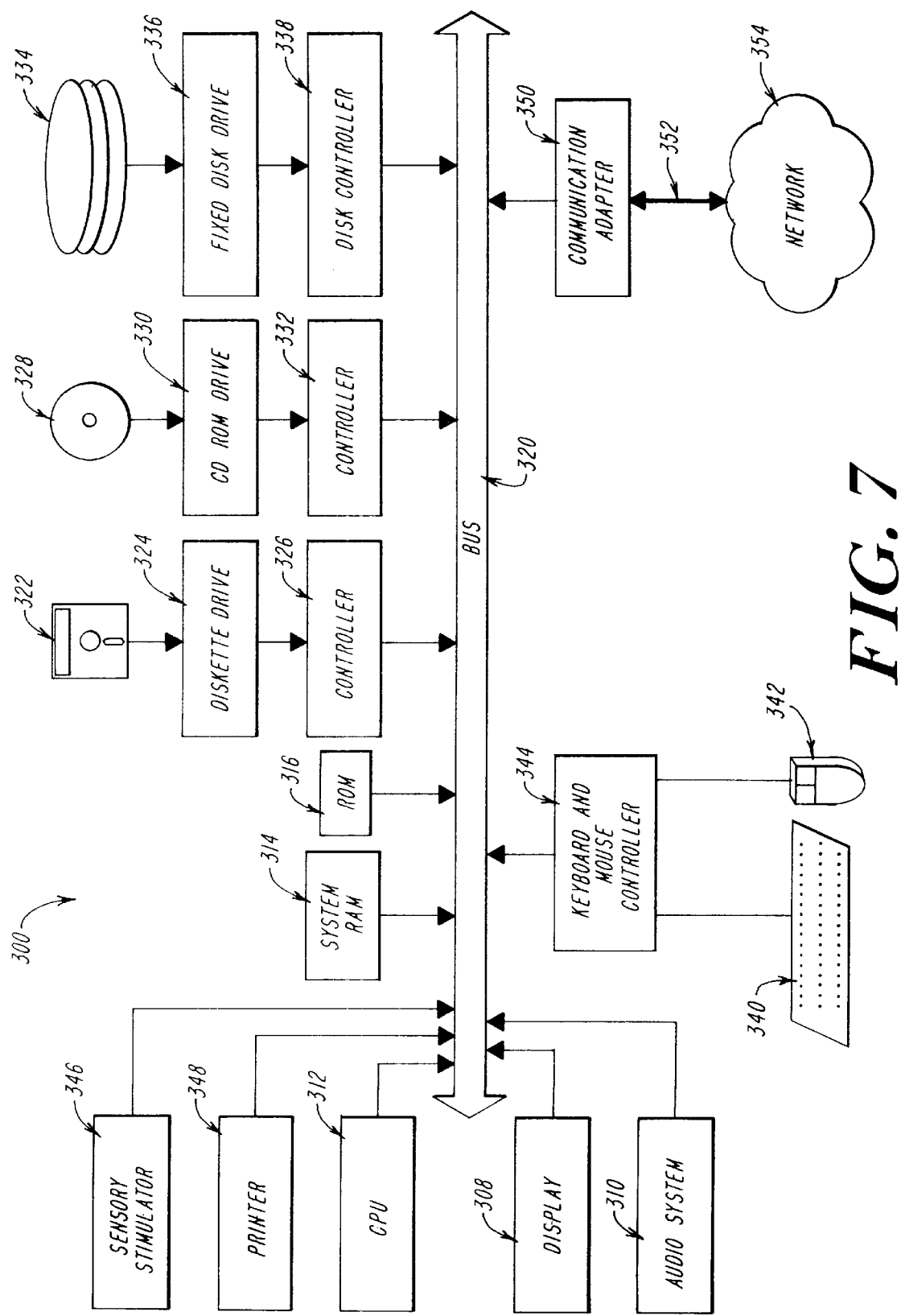
FIG. 7 illustrates a computer system on which the invention may be implemented.

Referring now to FIG. 7, a computer system 300 on which the invention may be implemented is shown. Computer system 300 may be provided, for example, as an IBM compatible computer or any other equivalent computer system. The exemplary computer system 300 of FIG. 7 is for descriptive purposes only. Although the description may refer to terms commonly used in describing particular computer systems, the description and concepts equally apply to other processing systems, including systems having architectures dissimilar to that shown in FIG. 7.

Computer system 300 includes a central processing unit (CPU) 312, which may be provided, for example, as a conventional microprocessor, a random access memory (RAM) 314 for temporary storage of information, and a read only memory (ROM) 316 for permanent storage of information. Computer system 300 also includes a display 308, an audio system 310 and a sensory stimulator 346. Each of the aforementioned components are coupled to a bus 320. Operation of computer system 300 is generally controlled and coordinated by operating system software. The operating system controls allocation of system resources and performs tasks such as processing, scheduling, memory management, networking, and I/O services, among things. Thus, an operating system resident in system memory and executed by CPU 312 coordinates the operation of the other elements of computer system 300.

Also coupled to bus 320 is a non-volatile mass storage device which may be provided as a diskette 322. Diskette 322 is insertable into a diskette drive 324 which is, in turn, coupled to bus 320 by a controller 326. Similarly, a compact disc (CD) ROM 328 is insertable into a CD ROM drive 330 which is, in turn, coupled to bus 320 by a controller 332. A hard disk 334 is typically provided as part of a fixed disk drive 336 which is coupled to bus 320 by a disk controller 338.

Data and software may be provided to and extracted from computer system 300 via removable storage media such as diskette 322 and CD ROM 328. For example, data values generated using techniques to be described above in conjunction with FIGS. 3–6 may be stored on storage media similar to media 322, 328. The data values may then be retrieved from the media 322, 328 by CPU 312 and utilized by CPU 312 to perform color printing of scanned or stored mixed color documents. Alternatively, CPU 312 may simply store such data values in ROM 316.

Alternatively still, computer software useful for matching may be stored on storage media similar to media 322, 328. Such computer software may be retrieved from media 322, 328 for immediate execution by CPU 312 or by other processors included in one or more peripherals of computer system 300 such as display 308, audio system 310 or sensory stimulator 346. CPU 312 may retrieve the computer software and subsequently store the software in RAM 314 or ROM 316 for later execution.

User input to computer system 300 may be provided by a number of devices. For example, a keyboard 340 and a mouse 342 are coupled to bus 320 by a controller 344. Sensory stimulator 346 may also function as an input device and may be provided, for example, as a hand held sensor/vibration mechanism coupled to bus 320.

Computer system 300 also includes a communications adaptor 350 which allows the system to be interconnected to a local area network (LAN) or a wide area network (WAN), schematically illustrated by bus 352 and network 354. Thus, data and computer program software can be transferred to and from computer system 300 via adapter 350, bus 352 and network 354.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

It will be understood that the foregoing is only illustrative of the principles of the invention, and that various modifications can be made by those skilled in the art without departing from the scope and spirit of the invention.

What is claimed is:

1. A method for providing a personal page on a computer system accessible to a plurality of remote users through a computer network, the remote users having profile information stored in the computer network and accessible to other remote users, comprising the steps of:

a) acceptable profile information from a plurality of remote users;

b) prompting a page-creating remote user with a plurality of page templates for the personal page and receiving a template selection from the remote user;

c) prompting the page-creating remote user to enter text to the personal page and receiving entered text from the remote user;

d) prompting the page-creating remote user to select or enter graphical information to display on the personal page and receiving the selection or entry from the remote user;

e) storing attributes representing each selection or entry made by the page-creating remote user in one or more databases;

f) providing the page-creating remote user with means to input security parameters for the personal page, the security parameters specifying authorization of at least one other remote user to access the personal page;

g) storing the security parameters in one or more databases; and h) displaying the personal page upon request only to remote users who are authorized to access the personal page.

2. The method of claim 1, wherein each page template is stored as a plurality of rows in one or more databases on the computer system.

3. The method of claim 2, wherein at least one row for each page template provides the overall layout of the personal page.

4. The method of claim 3, wherein at least one row for each page template corresponds to a field in the page template for receiving a remote user selection or entry.

5. The method of claim 4, wherein the attributes stored in one or more databases are each stored in a row corresponding to a field in the page template.

6. The method of claim 4, wherein the graphics attribute stored represents the location of the graphics file selected or entered by the remote user.

7. The method of claim 3, wherein the row corresponding to the overall layout of the page template includes HTML code describing the page template layout.

8. The method of claim 7, wherein the personal page is displayed to an authorized remote user by retrieving the rows in one or more databases corresponding to the page template, retrieving the rows in one or more databases corresponding to the attributes representing selections or entries by the page-creating user, and graphically displaying the page-creating user's selections and entries using the HTML code describing the page template layout.

9. The method of claim 1, wherein only graphics having a smaller storage size than a predetermined storage size may be entered by a user.

10. A method of providing a personal page on a computer system accessible to a plurality of remote users through a computer network, each remote user having profile information stored on the system, comprising the steps of:

a) providing a page-creating user with a plurality of page templates for selection for the personal page;

b) providing the page-creating remote user with a means for contributing text to the personal page;

c) providing the page-creating remote user with a means for contributing graphics to the personal page;

d) providing the page-creating remote user with a means for accessing the profile information of other remote users for selecting other remote users to whom the page-creating remote user may wish to allow access to the personal page;

e) providing the page-creating remote user with a means for entering security attributes authorizing at least one other remote user to view the personal page; and f) displaying the personal page only to authorized remote users.

11. The method of claim 10, wherein each page template is stored as a plurality of rows in one or more databases on the local computer network.

12. The method of claim 11, wherein at least one row for each page template provides the overall layout of the personal page.

13. The method of claim 12, wherein attributes representing page-creating remote user contributions to the personal page are stored in one or more databases, each attribute stored in a row corresponding to a field in the page template.

14. The method of claim 12, wherein the row corresponding to the overall layout of the personal page includes HTML code describing the overall layout.

15. The method of claim 14, wherein the personal page is displayed to an authorized remote user by retrieving the rows in one or more databases corresponding to the page template, retrieving the rows in one or more databases corresponding to the attributes representing selections or entries by the page-creating user, and graphically displaying the page-creating user's selections and entries using the HTML code describing the page template layout.

16. An apparatus for providing a personal page on a computer system accessible to a plurality of remote users through a computer network, each remote user having profile information stored on the system, comprising:

a) means for storing profile information relating to each remote user;

b) means for providing a page-creating remote user with a plurality of pre-stored page templates for selection for the personal page;

c) means for the page-creating remote user to contribute text to the personal page;

d) means for the page-creating remote user to contribute graphics to the personal page;

e) means for the page-creating remote user to access the profile information of other remote users for selecting other remote users to whom the page-creating remote user may wish to allow access to the personal page;

f) means for the page-creating remote user to enter security attributes authorizing at least one other remote user to view the personal page; and g) means for displaying the personal page only to authorized remote users.

17. The apparatus of claim 16, wherein each pre-stored page template is stored as a plurality of rows in the one or more databases on the local computer network.

18. The apparatus of claim 17, wherein at least one row corresponding to each page template provides the overall layout of the page template.

19. The apparatus of claim 18, wherein attributes representing remote user selection and contributions to the personal page are stored in one or more databases, each attribute stored in a row corresponding to a field in the page template.

20. The apparatus of claim 19 wherein the means for displaying the personal page to an authorized remote user includes retrieving the rows in one or more databases corresponding to the user selected page template, retrieving the rows in one or more databases corresponding to the attributes representing selections or entries by the page-creating user, and graphically displaying the page-creating user's selections and entries using the page template layout.

21. A computer program product comprising computer useable medium having computer readable program code to:

a) prompt a page-creating remote user with a plurality of page templates for displaying personal information and to receive a template selection from the remote user;

b) prompt the page-creating remote user to enter text to the personal page and to receive entered text from the remote user;

c) prompt the page-creating remote user to select or enter graphical information to display on the personal page and to receive the selection or entry from the remote user;

d) store attributes representing each selection or entry made by the page-creating remote user in one or more databases;

e) provide the page-creating remote user with means to input security parameters for the personal page, the security parameters specifying authorization of at least one other remote user to view the personal page;

f) store the security parameters in one or more databases; and g) display the personal page only to remote users who are authorized to access the personal page.

22. The method of claim 21, wherein the computer readable program code to display the personal page to an authorized remote user includes computer readable program code to retrieve the attributes representing selections or entries by the page-creating user, and graphically displaying the page-creating user's selections and entries using the selected page template.

23. The method of claim 1, further comprising providing the page-creating remote user with a means for identifying and selecting at least one other remote user for authorization to view personal page that includes searching user profiles.

24. The method of claim 23, wherein the means for identifying and selecting at least one other remote user includes searching profile information.

25. The method of claim 1, wherein the page-creating user may grant authorization to view the personal page to another remote user when sending an electronic mail message to that other remote user.

26. The method of claim 1, wherein when the page-creating user authorizes a remote user to view the personal page, an electronic mail message is sent by the computer system to the authorized remote user indicating to that user that the user may view the personal page of the page-creating remote user.

27. The method of claim 1, further comprising providing means for the page-creating remote user to include a voice greeting in the personal page.

28. The apparatus of claim 16, further comprising profile matching means for selecting at least one other user of the system to authorize that user to view the personal page.

29. In a networked computer system having a plurality of remote users, a computer program product comprising computer useable medium having computer readable program code to:

a) store profile information relating to each remote user, the profile information being accessible to other remote users of the system;

b) provide a page-creating remote user with means to create a personal page having personal information;

c) store attributes representing the personal information in the page-creating remote user's personal page in one or more databases;

d) provide the page-creating remote user with means to select other remote users to whom the page-creating remote user may wish to allow access to the personal page;

e) provide the page-creating remote user with means to input security parameters for the personal page, the security parameters specifying authorization of at least one other selected remote user to view the personal page; and f) store the security parameters in one or more databases.

30. The computer program product of claim 29, wherein the personal page having personal information includes graphical information.

31. The computer program product of claim 29, wherein the means to select other remote users includes means for searching user profiles including personal information for other remote users.

32. In a networked computer system having a plurality of remote users, a system for providing a personal page comprising:

a) means for storing profile information relating to each remote user, the profile information being accessible to other remote users of the system;

b) means for creating a personal page having personal information for a page-creating remote user;

c) means for storing attributes representing the personal information in the page-creating remote user's personal page in one or more databases;

d) means for allowing the page-creating remote user to select other remote users to whom the page-creating remote user may wish to allow access to the personal page;

e) means for allowing the page-creating remote user to input security parameters for the personal page, the security parameters specifying authorization of at least one other selected remote user to view the personal page; and f) means for storing the security parameters in one or more databases.

33. The system of claim 32, wherein the means for creating a personal page having personal information for a page-creating remote user includes means for placing graphical information on the personal page.

34. The system of claim 32, wherein the means to select other remote users includes means for searching user profiles including personal information for other remote users.

* * * * *

US006253216C1

(12) EX PARTE REEXAMINATION CERTIFICATE (9124th)

United States Patent
Sutcliffe et al.

(10) Number: US 6,253,216 C1
(45) Certificate Issued: Jul. 10, 2012

(54) METHOD AND APPARATUS FOR PROVIDING A PERSONAL PAGE

(75) Inventors: Andrew B. Sutcliffe, Tyngsboro, MA (US); Dennis Geller, Brookline, MA (US); Kevin A. Dunn, Boston, MA (US); Mikel Maron, Cupertino, CA (US)

(73) Assignee: Tele-Publishing, Inc., Boston, MA (US)

Reexamination Request:
No. 90/010,792, Dec. 22, 2009

Reexamination Certificate for:
Patent No.: 6,253,216
Issued: Jun. 26, 2001
Appl. No.: 08/876,008
Filed: Jun. 13, 1997

(51) Int. Cl.
*G06F 17/21* (2006.01)
*G06Q 30/00* (2006.01)

(52) U.S. Cl. ..................................... 715/205
(58) Field of Classification Search .................. None
See application file for complete search history.

(56) References Cited

To view the complete listing of prior art documents cited during the proceeding for Reexamination Control Number 90/010,792, please refer to the USPTO's public Patent Application Information Retrieval (PAIR) system under the Display References tab.

*Primary Examiner* — Ovidio Escalante

(57) ABSTRACT

The apparatus of the invention includes a local computer network. Remote users may connect to the local computer network through a larger network, such as the Internet. The local computer network has at least one server computer which can be accessed by remote users. The local computer network also has at least one computer software program and at least one database located therein. The computer software programs prompt a remote user to select a page template for displaying the personal page. The programs next allow the remote user to contribute text and graphics to the personal page. The programs also allow the remote user to authorize others to review the personal page. The programs store attributes representing the layout of the personal page, the text and graphics contributed by the remote user, and the authorization information entered by the remote user in the one or more databases located on the local computer network.

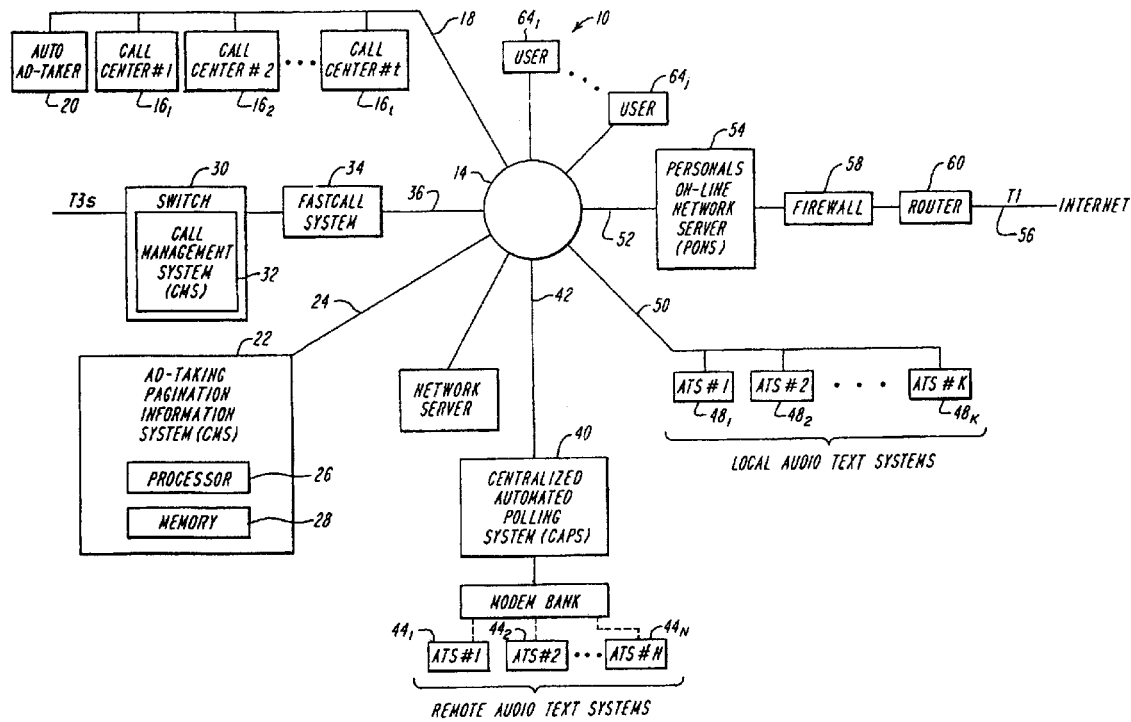

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10-20 and 28-34 is confirmed.

Claims 1 and 21 are determined to be patentable as amended.

Claims 2-9 and 22-27 dependent on an amended claim, are determined to be patentable.

1. A method for providing a personal page on a computer system accessible to a plurality of remote users through a computer network, the remote users having profile information stored in the computer network and accessible to other remote users, comprising the steps of:
   a) [acceptable] *accepting* profile information from a plurality of remote users;
   b) prompting a page-creating remote user with a plurality of page templates for the personal page and receiving a template selection from the remote user;
   c) prompting the page-creating remote user to enter text to the personal page and receiving entered text from the remote user;
   d) prompting the page-creating remote user to select or enter graphical information to display on the personal page and receiving the selection or entry from the remote user;
   e) storing attributes representing each selection or entry made by the page-creating remote user in one or more databases;
   f) providing the page-creating remote user with means to input security parameters for the personal page, the security parameters specifying authorization of at least one other remote user to access the personal page;
   g) storing the security parameters in one or more databases; and
   h) displaying the personal page upon request only to remote users who are authorized to access the personal page.

21. A computer program product comprising computer useable medium having computer readable program code to:
    a) prompt a page-creating remote user with a plurality of page templates for displaying *a* personal [information] *page* and to receive a template selection from the remote user;
    b) prompt the page-creating remote user to enter text to the personal page and to receive entered text from the remote user;
    c) prompt the page-creating remote user to select or enter graphical information to display on the personal page and to receive the selection or entry from the remote user;
    d) store attributes representing each selection or entry made by the page-creating remote user in one or more databases;
    e) provide the page-creating remote user with means to input security parameters for the personal page, the security parameters specifying authorization of at least one other remote user to view the personal page;
    f) store the security parameters in one or more databases; and
    g) display the personal page only to remote users who are authorized to access the personal page.

* * * * *